US008521508B2

(12) United States Patent  
Sata

(10) Patent No.: US 8,521,508 B2  
(45) Date of Patent: Aug. 27, 2013

(54) TRANSLATION APPARATUS AND TRANSLATION METHOD

(75) Inventor: Ichiko Sata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 144 days.

(21) Appl. No.: 13/046,249

(22) Filed: Mar. 11, 2011

(65) Prior Publication Data

US 2011/0224968 A1   Sep. 15, 2011

(30) Foreign Application Priority Data

Mar. 12, 2010  (JP) ................................ 2010-056366

(51) Int. Cl.  
*G06F 17/28*  (2006.01)

(52) U.S. Cl.  
USPC ............................ 704/2; 704/4; 704/5; 704/9

(58) Field of Classification Search  
USPC ....................................................... 704/1–10  
See application file for complete search history.

(56) References Cited

U.S. PATENT DOCUMENTS

| | | | | |
|---|---|---|---|---|
| 5,612,872 | A * | 3/1997 | Fujita | 704/2 |
| 5,826,219 | A * | 10/1998 | Kutsumi | 704/4 |
| 6,047,252 | A * | 4/2000 | Kumano et al. | 704/2 |
| 6,282,507 | B1 * | 8/2001 | Horiguchi et al. | 704/3 |
| 2004/0030542 | A1 * | 2/2004 | Fuji | 704/2 |
| 2004/0122656 | A1 * | 6/2004 | Abir | 704/4 |
| 2006/0217961 | A1 * | 9/2006 | Masuichi et al. | 704/3 |
| 2007/0061152 | A1 | 3/2007 | Doi | |
| 2007/0255550 | A1 * | 11/2007 | Menezes et al. | 704/2 |

FOREIGN PATENT DOCUMENTS

| | | |
|---|---|---|
| JP | 64-65662 | 3/1989 |
| JP | 8-263499 A | 10/1996 |
| JP | 2006-268151 A | 10/2006 |
| JP | 2007-80097 | 3/2007 |

OTHER PUBLICATIONS

Brown, Ralf D.; Hutchinson, Rebecca; Bennett, Paul N.; Carbonell, Jaime G.; and Jansen, Peter J., "Reducing Boundary Friction Using Translation-Fragment Overlap" (2003). Institute for Software Research. Paper 419. http://repository.cmu.edu/isr/419.*

Carbonell, Jaime G.; Klein, Steve; Miller, David; Steinbaum, Mike; Grassiany, Tomer; and Frey, Jochen, "Context-Based Machine Translation" (2006). Computer Science Department. Paper 273. http://repository.cmu.edu/compsci/273.*

* cited by examiner

*Primary Examiner* — Douglas Godbold  
*Assistant Examiner* — Ernest Estes  
(74) *Attorney, Agent, or Firm* — Birch, Stewart, Kolasch & Birch, LLP

(57) ABSTRACT

A display section displays an obtained character-string written in a first language. A translation unit extraction section divides the obtained character-string into predetermined translation units, and extracts a character-string for each translation unit. A translation unit translates the extracted character-strings in the translation units into a second language. A display control section displays, on the display section, the result of translation by the translation section from the head of the character-string being displayed, in a state of being associated with the character-string.

9 Claims, 7 Drawing Sheets

FIG.4A we estimate that a billion people are hungry around / the globe
～と見積もる　　　　　人々　　　空腹の　～の周辺で

FIG.4B we estimate that a billion people (are hungry around) /
～と見積もる　　　　　人々 are hungry around the globe
空腹の　世界中で

FIG.4C we estimate that a billion people are hungry around the globe
～と見積もる　　　　　人々　　　空腹の　世界中で

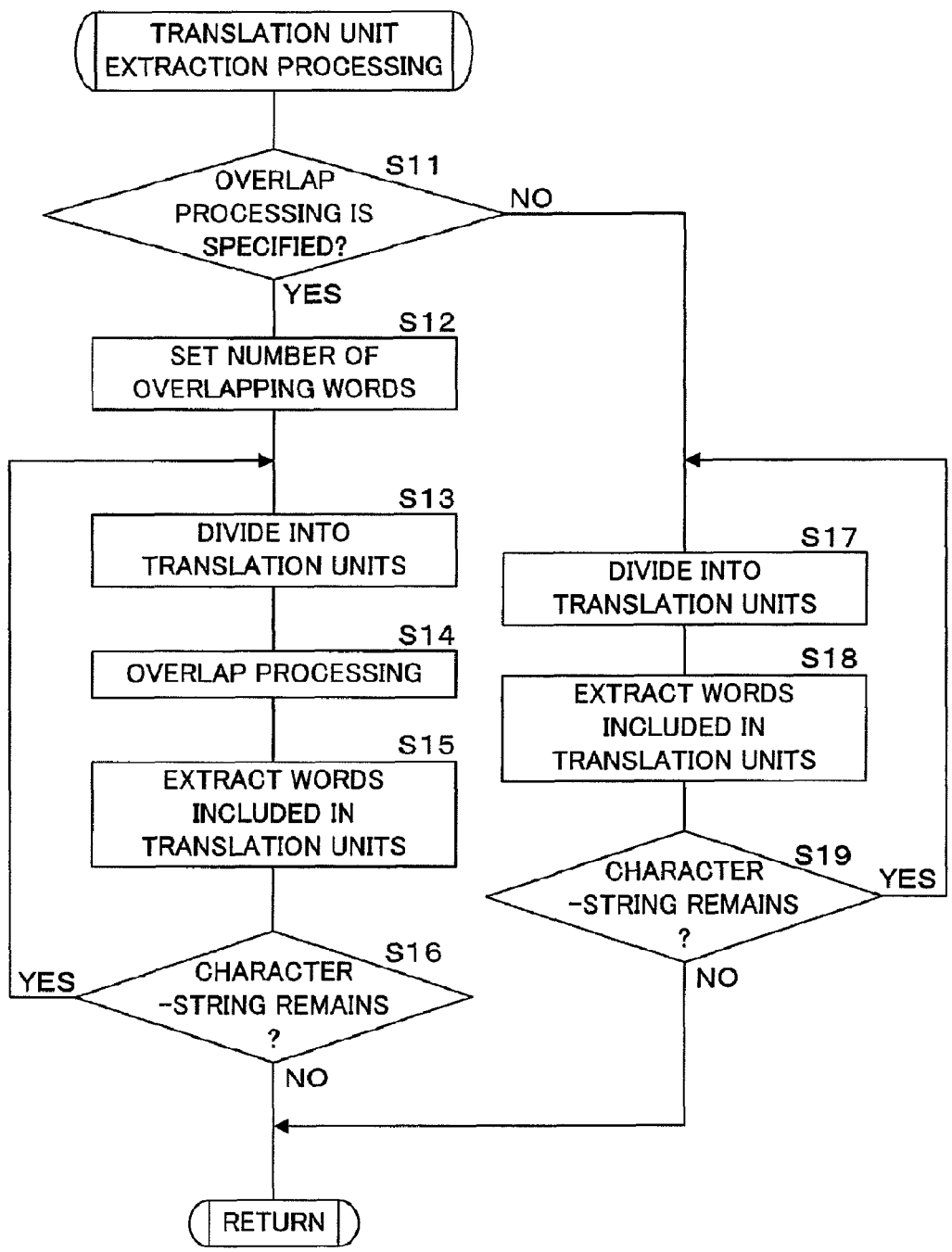

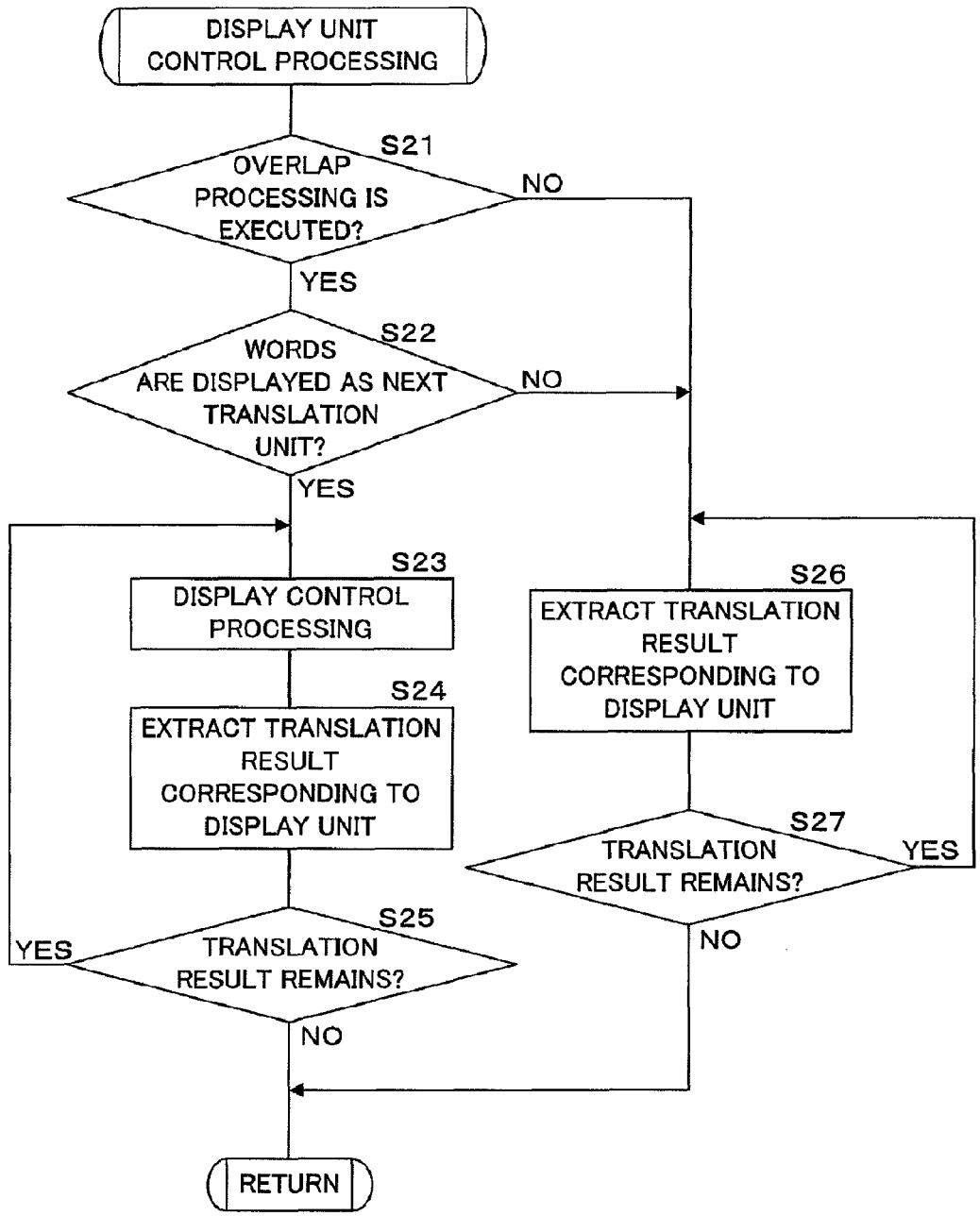

TRANSLATION APPARATUS AND TRANSLATION METHOD

CROSS-REFERENCE TO RELATED APPLICATIONS

This Nonprovisional application claims priority under 35 U.S.C. §119(a) on Patent Application No. 2010-56366 filed in Japan on Mar. 12, 2010, the entire contents of which are hereby incorporated by reference.

BACKGROUND

1. Technical Field

The present invention relates to a translation apparatus and a translation method for translating a character-string written in a first language into a second language.

2. Description of Related Art

It was formally known that a voice recognition technology recognizes an uttered voice and converts it into text, and an automatic translation technology translates a character-string in a first language into a character-string in a second language. Moreover, a voice translation system, a combination of above-mentioned technologies, has been being put into practical use. However, the current technical level has significant problems in terms of the processing speed, the processing accuracy, and the users' expectations in achieving the quality.

Therefore, comparing with conventional technologies, a new apparatus has been proposed that is able to translate into a natural sentence in a short time so that the user can comprehend a whole sentence (please refer to Japanese Patent Application Laid-Open No. H1108-263499). According to Japanese Patent Application Laid-Open No. H08-263499, the apparatus divides the pre-translation character-string obtained from an uttered voice into prepared plural division units, and it further translates each divisional unit into the target language (partial translation), translates the character-string into the target language without being divided (whole translation). Then, the result of the partial translation and the result of the whole translation are compared with each other. Consequently, the apparatus outputs the final translation result after eliminating redundant expressions.

SUMMARY OF THE INVENTION

According to Japanese Patent Application Laid-Open No. H08-263499, the apparatus has to prepare division patterns for performing partial translation. In addition, when the apparatus does not enumerate sufficient division patterns or does not provide the excellent quality of the division pattern for obtaining translation results, it hardly realizes highly accurate translation processing. Further, the apparatus performs both partial translation and whole translation, it then compares the result of the partial translation with the result of the whole translation and deletes redundant expressions; therefore, the translation hampers a real-time process.

The present invention is made in view of above-mentioned circumstances, and it provides a translation apparatus and a translation method that executes highly real-time translation processing while improving translation accuracy, by progressively translating input character-strings at any moment.

According to the present invention, a translation apparatus translates a character-string written in a first language into a second language. The present invention provides five main sections. First of all, it provides an obtaining section for obtaining a character-string written in the first language at any moment. Second, the present invention provides a display section for displaying the character-string obtained by the obtaining section. Third, it provides an extraction section for extracting a character-string included in a predetermined unit to be translated. Fourth, it provides a translation section for translating into the second language for each character-string extracted by the extraction section. Fifth, it provides a display control section for displaying a result of translation by the translation section in a state of being associated with the character-string displayed on the display section.

According to the present invention, the translation apparatus obtains a character-string written in a first language at any moment. Besides, it displays the obtained character-string and translates into a second language as needed. The translation apparatus further displays the translation result in a state of being associated with the character-string in the first language while the character-string in the first language is displaying. Since the translation apparatus displays the character-string in the first language and the character-string in the second language as the translated character-strings associated with the first language, the viewer/listener can readily grasp both the input character-string in the first language and the character string in the second language as the translation result. Moreover, the translation apparatus extracts a character-string included in a predetermined unit from the obtained character-string as needed, and then it translates each extracted character-string into a second language. Consequently, the translation apparatus successively translates input character-strings as needed without a wait for the interruption or end of character-string input, translation processing can be progressively performed, so it progressively performs translation processing and enables highly real-time processing from the input character-string to the display of the translation result.

In the translation apparatus according to the present invention, the translation section assigns an equivalent in the second language to a word included in the character-string extracted by the extraction section.

According to the present invention, the translation apparatus calls translation processing to assign an equivalent word into the second language to a word included in a character-string written in the first language. For example, the translation apparatus generates equivalent terms in units of words, collocations (compound words, verb phrases, idioms and the like consisting of two or more words) and phrases (short units into which words and collocations are coupled) included in the character-string in the first language. Moreover, the translation apparatus performs the procedure in which equivalent terms do not assign to words, collocations and phrases with low difficulty intentionally or in response to the "assignment level" preset by the user. Consequently, for example, even when an error occurs in the input character-strings or when an error occurs in the voice recognition embedded in the conversion of an input voice into a character-string, the error does not affect the translation result of the entire sentence and can be kept within the bounds of a local error. Thereby, the translation apparatus improves translation accuracy. Moreover, by adopting the assignment translation method, even with units not optimum in normal translation processing, the translation apparatus may process highly accurate translation, so that it further improves the real-time process.

In the translation apparatus according to the present invention, the extraction section extracts a predetermined number of words from an end of a character-string in a current predetermined unit. Then the translation apparatus appends the result of the extraction section onto a head of a character-string in the next predetermined unit.

According to the present invention, in the translation apparatus, for character-strings in translation units (predetermined units to be translated) lined one behind another, the translation apparatus appends a predetermined number of words from the end of the character-string in the current translation unit to the head of the character-string in the next translation unit and translates the result. Consequently, even when the translation apparatus divides a collocation into two translation units, it translates part of the collocation included in the current translation unit while being incorporated into the head of the next translation unit. Thereby, even when the translation units are not always optimum for translating, the translation apparatus is feasible to process highly accurate translation.

In the translation apparatus according to the present invention, the display control section displays, on the display section, a translation result of the predetermined number of words from the end of the character-string in the current predetermined unit as a translation result of the character-string in the next predetermined unit.

According to the present invention, the translation apparatus displays the translation result of a predetermined number of words from the end of the character-string in the current translation unit as the translation result of the character-string in the next translation unit. Consequently, even when the translation apparatus divides a collocation into two translation units successively, it is attainable to process highly accurate translation, and efficiently display the translation result. Moreover, in a case where the translation apparatus displays both the translation result of part of the collocation included in the current translation unit temporarily and the translation result of the next translation unit including the part is displayed, when it deletes the display of the translation result of the part and the translation result of the next translation unit, screen flickers due to the display rewriting. However, the present invention can avoid this situation.

According to the present invention, the translation apparatus provides a word number acceptance section for accepting the number of words of the character-string in the current predetermined unit. Then, the translation apparatus appends these words to the character-string in the next predetermined unit, and the extraction section appends words of the number accepted by the word number acceptance section, from the end of the character-string in the current predetermined unit, to the head of the character-string in the next predetermined unit.

According to the present invention, the translation apparatus can arbitrarily change the number of words of the character-string included in the current translation unit which words are to be appended to the head of the next translation unit.

In the translation apparatus according to the present invention, the obtaining section includes at least one of an input acceptance section, as needed, that accepts input of a character-string written in the first language and a character-string conversion section that accepts, as needed, input of a voice uttered in the first language and converts the accepted voice into a character-string at any moment.

According to the present invention, the translation apparatus accepts at least one of two functions. First the apparatus accepts a character-string written in the first language. Second, it converts a voice uttered in the first language into a character-string. For example, it does not only transmit and receive character information through a video conference system or a chat but also translates voice information into the second language.

In the translation apparatus according to the present invention, the extraction section designates four kinds of predetermined unit. First, it designates a character-string accepted by the input acceptance section before the input of the character-string is interrupted for not less than a predetermined period of time from start of the input. Second, it designates a character-string accepted by the input acceptance section within a preset period of time. Third, it designates a character-string of a preset number of words. Fourth, it designates a character-string of a preset text length.

According to the present invention, when the translation apparatus accepts the input of a character-string written in the first language, it translates the character-string into one translation unit as described below: a character-string inputted before the input of the character-string is interrupted for not less than the predetermined period of time from the start of the input; a character-string inputted within the preset period of time; a character-string of the preset number of words; or a character-string of the preset text length. Consequently a translation system employing, as the input section, a conventionally used processing system such as a chat system can be constructed without modifying the processor.

According to the present invention, in the translation apparatus, the extraction section designates four kinds of the predetermined unit. First, this section designates a character-string obtained by converting a voice accepted by the character-string conversion section before silence continues for not less than a predetermined period of time from start of the input of the voice. Second, it designates a character-string in a processing unit when the character-string conversion section converts the voice into a character-string, a character-string obtained by converting a voice accepted by the character-string conversion section within a preset period of time. Third, it designates a character-string of a preset number of words. Fourth, it designates a character-string of a preset text length.

According to the present invention, in the translation apparatus, when the apparatus accepts the input of a character-string obtained by converting a voice uttered in the first language, the character-string is translated with the following as one translation unit: a character-string obtained by converting a voice accepted before silence continues for not less than the predetermined period of time from the start of the acceptance of the voice; a character-string in a processing unit when the voice is converted into a character-string; a character-string obtained by converting the voice within the preset period of time; a character-string of the preset number-of words; or a character-string of the preset text length. Consequently, a translation system employing, as the input section, a conventionally used processing system such as a voice recognition system can be constructed without the need to modify the processing system.

A translation method according to the present invention is a translation method of translating a character-string written in a first language into a second language by a translation apparatus, and including steps of: the translation apparatus obtaining, as needed, a character-string written in the first language and displaying the obtained character-string on a display section; the translation apparatus extracting, as needed, a character-string included in a predetermined unit to be translated, from the obtained character-string; the translation apparatus performing translation into the second language for each extracted character-string; and the translation apparatus displaying a translation result on the display section in a state of being associated with the character-string displayed on the display section.

According to the present invention, since the character-strings inputted as needed are translated without a wait for the interruption or end of character-string input, translation processing is progressively performed. Consequently, highly real-time translation processing can be executed, so that for the user who inputs the character-string or the viewer/listener who confirms the character-string, stress of the waiting time in the translation processing can be reduced. Moreover, since the character-string in the first language and the character-string in the second language as the translation of the character-string are displayed in a state of being associated with each other, the user and the viewer/listener can readily grasp both the inputted character-string in the first language and the character-string in the second language as the translation result.

The above and further objects and features of the invention will more fully be apparent from the following detailed description with accompanying drawings.

BRIEF DESCRIPTION OF THE SEVERAL VIEWS OF THE DRAWINGS

FIGS. 4A to 4C are explanatory views showing examples of translation result display;

FIG. 6 is a flowchart showing the procedure of translation unit extraction processing; and FIG. 7 is a flowchart showing the procedure of display unit control processing.

DETAILED DESCRIPTION

Hereinafter, a translation apparatus, a translation method and a computer program according to the present invention will be described in detail with reference to the drawings showing an embodiment thereof. In the embodiment shown below, a structure will be described in which the computer program according to the present invention is read by a known personal computer, server computer or the like and is executed by the CPU (central processing unit) or the like of the personal computer or the server computer to thereby implement the translation apparatus according to the present invention. However, the translation apparatus according to the present invention may be implemented by hardware that acts equivalently.

Figure 1:
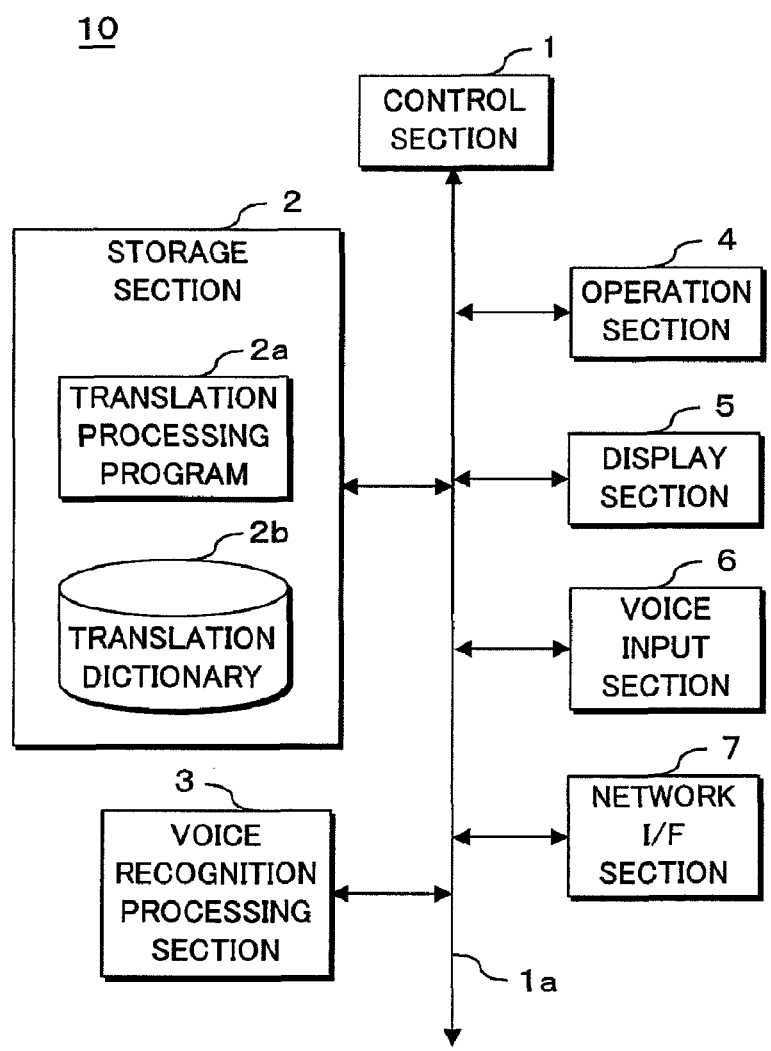
FIG. 1 is a block diagram showing the internal structure of a translation apparatus of the present embodiment.

FIG. 1 is a block diagram showing the internal structure of the translation apparatus of the present embodiment. The translation apparatus 10 of the present embodiment is provided with a control section 1, a storage section 2, a voice recognition processing section 3, an operation section 4, a display section 5, a voice input section 6 and a network I/F section 7. These hardware sections are interconnected through a bus 1a.

The control section 1 which is a CPU, an MPU (micro processing unit) or the like controls hardware sections as mentioned above, and executes control programs stored in the storage section 2 as appropriate. The storage section 2 is an EEPROM (electrically erasable and programmable read-only memory), a flash ROM, an HDD (hard disk drive) or the like. The storage section 2 stores various control programs necessary for operating the translation apparatus 10, various pieces of data generated when the control programs are executed by the control section 1, and the like. As the control programs, the storage section 2 stores, for example, a translation processing program 2a and a translation dictionary 2b for performing translation from a first language into a second language.

In the present embodiment, an example will be described in which the translation apparatus 10 performs translation from English into Japanese. Therefore, in the translation dictionary 2b, English words, collocations (compound words, verb phrases, idioms and the like consisting of two or more words) and phrases (short units into which words and collocations are coupled) are registered in a state of being associated with Japanese equivalents.

The present invention is not limited to the structure in which the pieces of information stored in the storage section 2 are pre-stored in the storage section 2. When the translation apparatus 10 has a driver (not shown) capable of reading data stored in an external memory (not shown), it may be performed to read pieces of information stored in the external memory by the driver and store them in the storage section 2. Moreover, it may be performed to download pieces of information from an external apparatus through the network I/F section 7 or the like and store them in the storage section 2.

The voice recognition processing section 3 performs voice recognition processing of converting a voice signal into text information. The voice recognition processing section 3 converts, for example, a voice signal inputted through the voice input section 6 described later into text information (character-string). Specifically, the voice recognition processing section 3 acoustically analyzes the voice signal to extract an acoustic parameter, compares the acoustic parameter with pre-stored acoustic models, and makes the word corresponding to the most similar acoustic model the recognition result. The voice recognition processing section 3 may have a structure in which a voice recognition processing program for the control section 1 to perform voice recognition processing and various databases necessary for performing voice recognition processing are stored in a storage section (not shown). In this case, voice recognition processing can be executed by the control section 1 executing the voice recognition processing program stored in the storage of the voice recognition processing section 3.

The operation section 4 which is, for example, a mouse, a keyboard or a tablet has various buttons necessary for the user to operate the translation apparatus 10. The operation section 4 sends out various pieces of information inputted by the user, to the control section 1, and the control section 1 executes the processing corresponding to the information obtained from the operation section 4.

The display section 5 is a display device such as an LCD (liquid crystal display), a CRT (cathode ray tube) or a PDP (plasma display panel). The display section 5 displays the video signal in response to an instruction from the control section 1.

The voice input section 6 has, for example, a microphone and an A/D (analog/digital) converter, and converts an analog voice signal collected by the microphone into a digital voice signal.

The operation section 4, the display section 5 and the voice input section 6 may be structured separately from the main unit of the translation apparatus 10 and connected to the main unit of the translation apparatus 10 through connecting lines, or these may be structured integrally with one another. The operation section 4 and the display section 5 may be formed of a touch panel or a tablet.

The network I/F section 7 is an interface for connection to an IP (Internet protocol) network such as a LAN (local area network) or a WAN (wide area network). The network I/F section 7 performs information transmission and reception with an external apparatus through the IP network.

Figure 2:
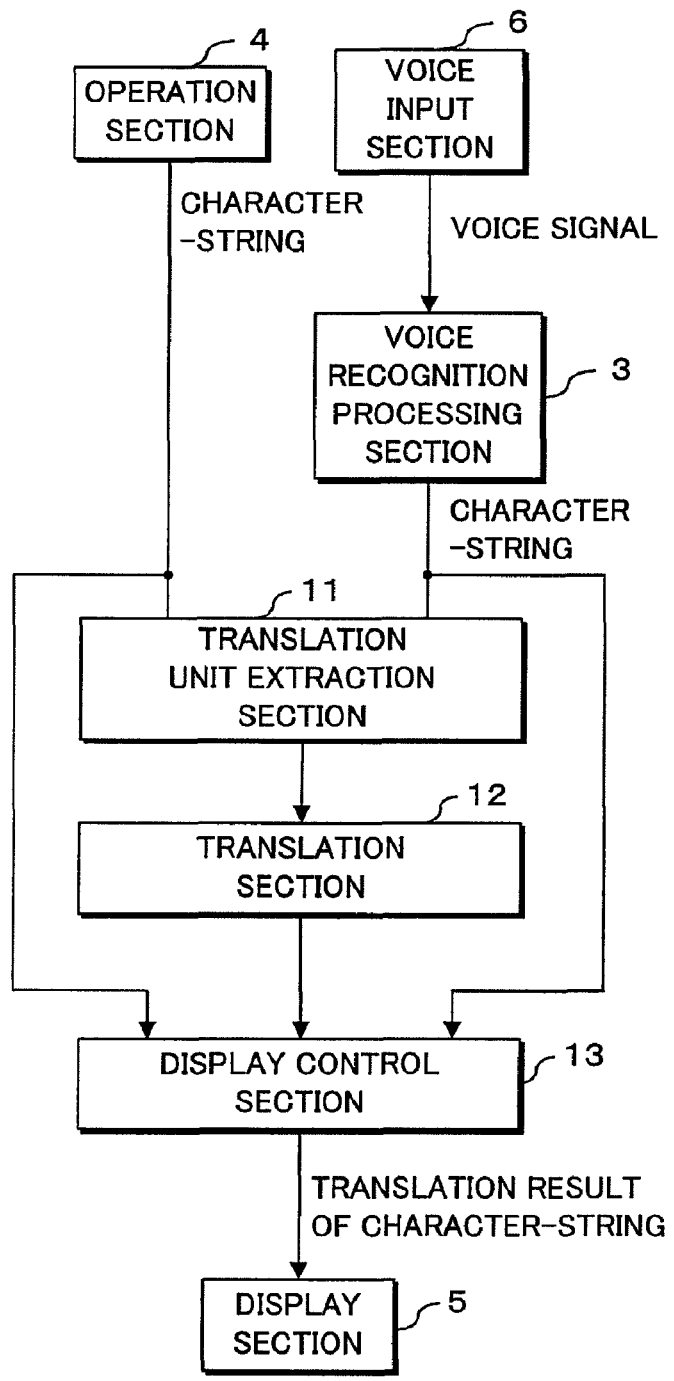
FIG. 2 is a functional block diagram showing the functional structure of the translation apparatus of the present embodiment.

Hereinafter, various functions implemented by the translation apparatus 10 executing the control programs stored in the storage section 2 in the translation apparatus 10 having the above-described structure will be described. FIG. 2 is a functional block diagram showing the functional structure of the translation apparatus 10 of the present invention. In the translation apparatus 10 of the present embodiment, when the execution of translation processing is requested through the operation section 4, the control section 1 executes the translation processing program 2a stored in the storage section 2. By this, the control section 1 implements the functions of a translation unit extraction section 11, a translation section 12, a display control section 13 and the like.

The translation apparatus 10 obtains, as the object to be translated, the text information (character-string) inputted through the operation section (obtaining section) 4 or the text information (character-string) into which the voice signal inputted through the voice input section 6 is converted by the voice recognition processing by the voice recognition processing section 3 as needed. The operation section 4 acts as an input acceptance section that accepts, as needed, the input of a character-string written in a first language (in this description, English). The voice input section 6 accepts, as needed, the input of a voice uttered in the first language (in this description, English), and the voice recognition processing section (obtaining section) 3 acts as a character-string conversion section that converts, as needed, the voice information accepted by the voice input section 6 into a character-string.

By this, when the translation apparatus 10 is, for example, an apparatus capable of implementing a chat system or a video conference system, the character information or the voice information transmitted and received through the chat system or the video conference system can be made the object to be translated.

As described above, the character-string obtained by the translation apparatus 10 as the object to be translated is inputted to the translation unit extraction section 11. The translation unit extraction section (extraction section) 11 divides the inputted character-string into units of translation processing (hereinafter, referred to as translation units) as needed, extracts character-strings included in the translation units, and outputs them to the translation section 12 for each translation unit. In the present embodiment, the translation unit extraction section 11 makes a preset number of words (for example, nine words) a predetermined translation unit, extracts a character-string of the predetermined number of words from the inputted character-string as needed, and outputs it to the translation section 12.

The predetermined translation unit in the character-string extraction by the translation unit extraction section 11 is not limited to the present number of words. For example, a character-string inputted before the input is intermitted for not less than a predetermined period of time from the start of the character-string input through the operation section 4, a character-string inputted through the operation section 4 within a preset period of time or a character-string of a preset text length may be one translation unit. Moreover, a character-string obtained by converting a voice signal inputted before silence continues for not less than a predetermined period of time from the start of voice signal input through the voice input section 6, a character-string of a processing unit in the conversion of the voice signal into a character-string by the voice recognition processing section 3 or a character-string obtained by conversion by the voice recognition processing section 3 within a preset period of time may be one translation unit.

Moreover, when extracting character-strings included in the translation units from the inputted character-string, the translation unit extraction section 11 of the present embodiment performs overlap processing in which for translation units lined one behind another, a predetermined number of words are extracted from the end of a character-string included in the current translation unit so as to be appended to the head of the next translation unit. In response to an instruction from the user through the operation section 4, the translation unit extraction section 11 performs either of extraction processing in which the overlap processing is performed or extraction processing in which the overlap processing is not performed. Whether to perform the overlap processing or not may be preset instead of being specified by the user.

Figure 3A:
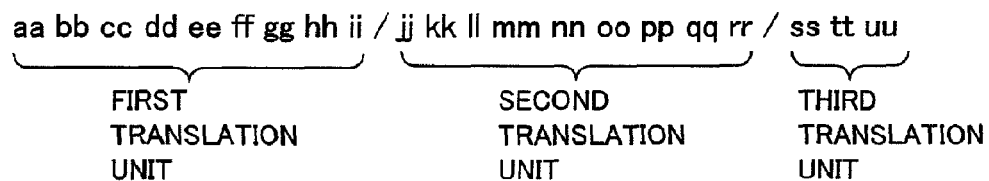
FIGS. 3A to 3D are explanatory views for explaining a translation unit.
Figure 3B:
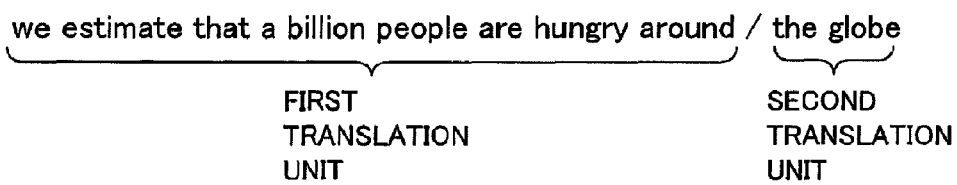
Figure 3C:
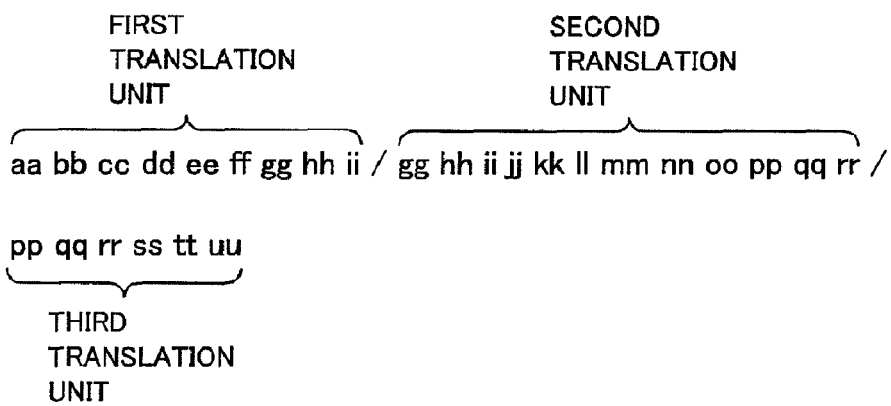

FIGS. 3A to 3D are explanatory views for explaining the translation unit. In FIGS. 3A and 3C, "aa", "bb", . . . each represent one English word. In this description, the predetermined translation unit into which the translation unit extraction section 11 performs division consists of nine words, and the number of words appended to the next translation unit in the overlap processing is three.

FIGS. 3A and 3B show translation units extracted by the extraction processing in which the overlap processing is not performed. When the user provides an instruction not to perform the overlap processing through the operation section 4, as shown in FIGS. 3A and 3B, the translation unit extraction section 11 divides the inputted character-string into nine-word units from the head, and designates the divisional translation units as a first translation unit, a second translation unit, . . . .

Figure 3D:
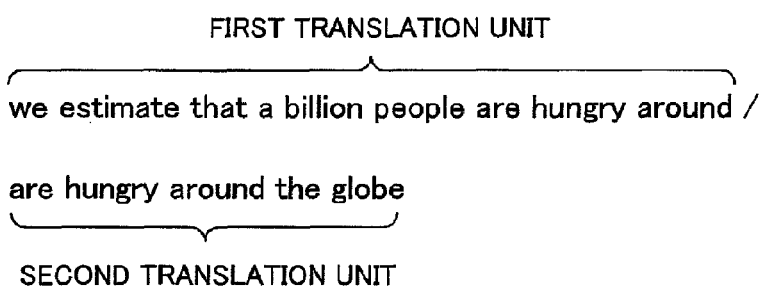

FIGS. 3C and 3D show translation units extracted by the extraction processing in which the overlap processing is performed. When the user provides an instruction to perform the overlap processing through the operation section 4, the translation unit extraction section 11 first divides the inputted character-string into nine-word units from the head. Then, for translation units lined one behind another, the translation unit extraction section 11 appends the three words from the end of the current translation unit to the head of the next translation unit, and designates the translation units as a first translation unit, a second translation unit, . . . . Specifically, as shown in FIG. 3C, the three words ("gg", "hh" and "ii") from the end of the first translation unit (current translation unit) are appended to the head of the second translation unit (next translation unit), and the three words ("pp", "qq" and "rr") from the end of the second translation unit (current translation unit) are appended to the head of the third translation unit (next translation unit). Moreover, as shown in FIG. 3D, the three words ("are", "hungry" and "around") from the end of the first translation unit (current translation unit) to the head of the second translation unit (next translation unit).

By performing the overlap processing, highly accurate translation processing can be performed even when a collocation is divided between translation units lined one behind another.

The number of words of the character-string included in the current translation unit which words are appended to the next predetermined unit may be preset or may be accepted from the user through the operation section (word number acceptance section) 4. By this, the number of words appended to the next translation unit can be arbitrarily set in the overlap processing, so that an appropriate number of words with which translation accuracy improves can be set.

The translation section 12 successively stores character-strings (character-strings included in the translation units) successively inputted from the translation unit extraction section 11, into its own buffer (not shown). The translation section 12 performs translation processing on the character-strings successively stored into the buffer by using the translation dictionary 2b. The translation section 12 of the present embodiments performs, for example, translation processing (assignment translation) in which equivalent terms in the second language (in this description, Japanese) are generated in units of words, collocations and phrases included in the character-strings. When difficulty levels for the words, collocations and phrases are registered in the translation dictionary 2b, the translation section 12 performs processing in which equivalent terms are not assigned to words, collocations and phrases with low difficulty intentionally or in response to the "assignment level" preset by the user. The translation section 12 reads the terms equivalent to the words, collocations and phrases included in the character-strings from the translation dictionary 2b, associates the words, collocations and phrases with equivalent Japanese terms, and outputs them to the display control section 13 as the translation result.

By thus performing the assignment translation, for example, even when there is an error in the character-strings inputted through the operation section 4 or when there is an error in the voice recognition by the voice recognition processing section 3, the error does not affect the translation result of the entire sentence and can be kept within the bounds of a local error, so that translation accuracy can be improved. Moreover, by adopting the assignment translation, even when the translation units into which the translation unit extraction section 11 performs division are not optimum in normal translation processing, highly accurate transladon processing is possible.

To the display control section 13, in addition to the translation result from the translation section 12, a character-string is inputted from the operation section 4 or the voice recognition processing section 3. When a character-string is inputted from the operation section 4 or the voice recognition processing section 3, the display control section 13 displays the inputted character-string on the display section 5 as needed. Moreover, when a translation result is inputted from the translation section 12, the display control section 13 displays the inputted translation result (Japanese equivalents) on the display section 5 in a state of being associated with the already displayed character-string (English words). The display control section 13 successively stores the translation results (the translation results of the translation units) successively inputted from the translation section 12, into its own buffer (not shown), and successively displays the stored translation results on the display section 5.

When displaying the translation result in a state of being associated with English words being displayed, the display control section 13 displays the translation result from the head of the English words. When the translation unit extraction section 11 has performed the overlap processing, it is possible for the display control section 13 of the present embodiment to display the words of the current translation unit which words are appended to the next translation unit by the overlap processing, as the translation result of the next translation unit.

This enables the display control section 13 not only to display the translation result from the head of the English words being displayed but also to appropriately display an appropriate translation result obtained by the appendage to the next translation unit by the overlap processing. In response to an instruction from the user through the operation section 4, the display control section 13 switches whether the translation result of the words appended to the next translation unit by the overlap processing is displayed as the translation result of the current translation unit or displayed as the translation result of the next translation unit.

FIGS. 4A to 4C are explanatory views showing examples of translation result display. FIG. 4A shows a condition in which the translation result is displayed from the head of the English words being displayed. When the user provides, through the operation section 4, an instruction to display, as the translation result of the current translation result, the translation result of the words appended to the next translation unit by the overlap processing, as shown in FIG. 4A, the display control section 13 displays the translation result from the head of the English words being displayed.

FIGS. 4B and 4C show a condition in which the translation result of the words appended to the next translation unit by the overlap processing is displayed as the translation result of the next translation unit. When the user provides, through the operation section 4, an instruction to display, as the translation result of the next translation unit, the translation result of the words appended to the next translation unit by the overlap processing, the display control section 13 displays the translation result as shown in FIGS. 4B and 4C. Specifically, the display control section 13 displays the translation result of the words ("are hungry around") appended to the next translation unit by the overlap processing, as the translation result of the next translation unit. FIG. 4B shows a first translation unit in the upper row and a second translation unit in the lower row, and indicates that the translation result of "are hungry around" in the first translation unit is displayed as the translation result of the second translation unit. In actuality, the display control section 13 displays the inputted English words and the Japanese equivalents in the condition as shown in FIG. 4C.

By thus displaying, as the translation result of the next translation unit, the translation result of the words appended to the next translation unit by the overlap processing, for example, even when a collocation is divided between translation units lined one behind another, the translation result can be efficiently displayed. Moreover, for example, in a case where the translation result of the current translation unit is temporarily displayed and the translation result of the next translation unit is displayed, when the display of the translation result of the words appended to the next translation unit by the overlap processing is deleted, screen flickering due to the display rewriting occurs. However, such a situation can be avoided when the words appended to the next translation unit by the overlap processing are displayed as the translation result of the next translation unit as described above.

Figure 5:
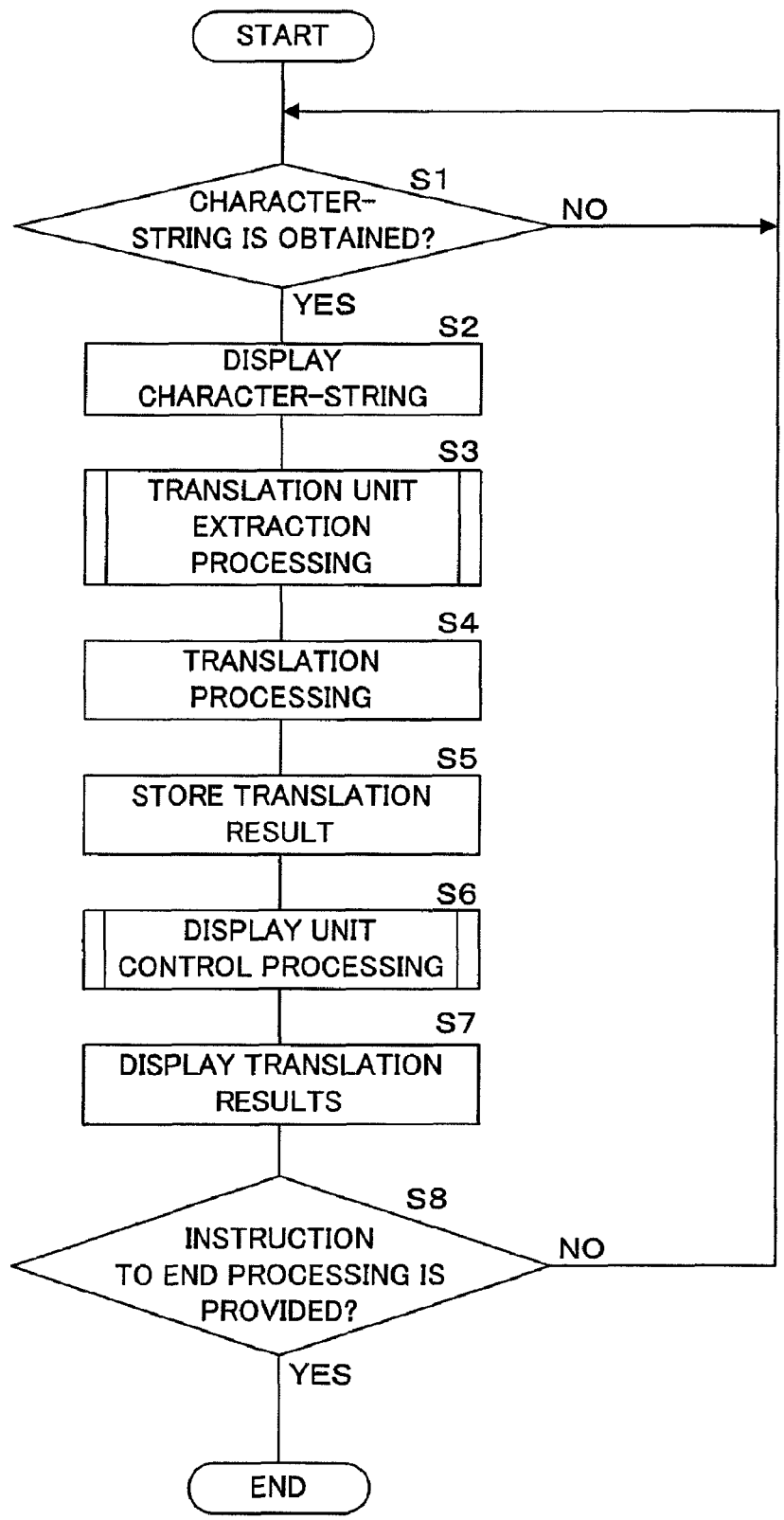
FIG. 5 is a flowchart showing the procedure of translation processing by the translation apparatus.

Hereinafter, the translation processing performed by the translation apparatus 10 of the present embodiment will be described based on flowcharts. FIG. 5 is a flowchart showing the procedure of the translation processing by the translation apparatus 10. The processing described below is executed by the control section 1 of the translation apparatus 10.

The control section 1 of the translation apparatus 10 determines whether or not a character-string is obtained through the operation section 4 or whether or not a character-string is obtained through the voice input section 6 and the voice recognition processing section 3 as the object to be translated (S1). When determining that no character-string is obtained (S1: NO), the control section 1 waits until a character-string is obtained. When determining that a character-string is obtained (S1: YES), the control section 1 displays the obtained character-string on the display section 5 (S2).

The control section 1 performs translation unit extraction processing on the successively obtained character-strings (S3), divides the character-strings into predetermined translation units, and extracts character-strings included in the translation units. FIG. 6 is a flowchart showing the procedure of the translation unit extraction processing.

Based on the setting from the user through the operation section 4, the control section 1 determines whether or not it is specified to perform the overlap processing in the extraction of the character-strings included in the translation units (S11). When determining that it is specified to perform the overlap processing (S11: YES), the control section 1 sets the number of words (the number of overlapping words) of the character-string included in the current translation unit which words are appended to the next translation unit in the overlap processing (S12). The number of overlapping words may be preset or may differ among users providing an instruction to start the translation processing.

The control section 1 divides the successively obtained character-strings into predetermined translation units (S13), and performs overlap processing (S14). Specifically, the control section 1 divides the character-strings into nine-word units. Then, for translation units lined one behind another, the control section 1 appends the three words from the end of the current translation unit to the head of the next translation unit, and designates them as a first translation unit, a second translation unit, . . . as shown in FIGS. 3C and 3D. The translation apparatus 10 of the present embodiment is not limited to the structure that treats nine words as one translation unit.

The control section 1 extracts the character-strings (words) included in the first translation unit, the second translation unit, . . . (S15). The control section 1 determines whether there is still an obtained character-string or not (S16). When determining that there is still an obtained character-string (S16: YES), the control section 1 returns to the processing of step S13, and repeats the processings of steps S13 to S15 on all the obtained character-strings. When determining that there is no obtained character-string (S16:NO), the control section 1 ends the translation unit extraction processing, and returns to the procedure shown in FIG. 5.

When determining at step S11 that it is not specified to perform the overlap processing (S11: NO), the control section 1 divides the successively obtained character-strings into predetermined translation units (S17), and extracts the character-strings (words) included in the translation units (S18). In this processing, the control section 1 divides the character-strings into nine-word units, and extracts the character-strings included in the divisional translation units. The control section 1 determines whether there is still an obtained character-string or not (S19). When determining that there is still an obtained character-string (S19: YES), the control section 1 returns to the processing of step S17, and repeats the processings of steps S17 and S18 on all the obtained character-strings. When determining that there is no obtained character-string (S19: NO), the control section 1 ends the translation unit extraction processing, and returns to the procedure shown in FIG. 5.

The control section 1 performs translation processing for each of the translation units successively extracted by the above-described translation unit extraction processing (S4). The control section 1 reads the Japanese terms equivalent to the words, collocations and phrases in the translation units from the translation dictionary 2b, and stores the English words and the Japanese equivalents into a predetermined buffer as the translation result for each translation unit (S5). The control section 1 performs display unit control processing on the translation results of the translation units (S6) to control the display unit when the translation result is displayed in a state of being associated with the English words displayed at step S2.

FIG. 7 is a flowchart showing the procedure of the display unit control processing. The control section 1 determines whether or not the overlap processing has been executed when the character-strings are divided into translation units at step S3 (S21). When determining that the overlap processing has been executed (S21: YES), the control section 1 determines whether or not it is specified to display the words of the current translation unit appended to the next translation unit by the overlap processing, as the translation result of the next translation unit (S22).

When determining that it is specified to display the words as the translation result of the next translation unit (S22: YES), the control section 1 performs predetermined display control processing (S23). Specifically, the control section 1 appends the translation result of the words of the immediately preceding translation unit which words are appended to the current translation unit by the overlap processing, to the translation result of the current translation unit, and removes the translation result of the words appended to the next translation unit by the overlap processing from the translation result of the current translation unit.

More precisely, the translation result of the words (character-string) which are the remainder when the words appended to the next translation unit by the overlap processing is removed from each translation unit extracted by the translation unit extraction processing of step S3 is made the translation result of the current translation unit. The translation result of the words removed from the current translation unit is included in the translation result of the next translation unit. The control section 1 incorporates the translation results of translation units lined one behind another into appropriate display units, and extracts the translation result corresponding to each display unit (S24).

The control section 1 determines whether there is still a translation result by step S4 or not (S25). When determining that there is still a translation result (S25: YES), the control section 1 returns to the processing of step S23, and repeats the processings of steps S23 and 24 on all the translation results. When determining that there is no translation result (S25: NO), the control section 1 ends the display unit control processing, and returns to the procedure shown in FIG. 5.

When determining at step S21 that the overlap processing has not been performed (S21: NO) or when determining at step S22 that it is not specified to display the words as the translation result of the next translation unit (S22: NO), the control section 1 shifts to the processing of step S26. The control section 1 extracts the translation results of the translation units for each unit of translation processing (translation unit) at step S4 (S26). The control section 1 determines whether there is still a translation result by step S4 or not (S27). When determining that there is still a translation result (S27: YES), the control section 1 returns to the processing of step S26, and repeats the processing of step S26 on all the translation results. When determining that there is no translation result (S27: NO), the control section 1 ends the display unit control processing, and returns to the procedure shown in FIG. 5.

The control section 1 displays the translation results successively extracted by the above-described display unit control processing, in a state of being associated with the English words displayed at step S2 (S7). By this, when the translation result is displayed in a state of being associated with the English words being displayed, the control section 1 can not only display it from the head of the English words but also display the words of the current translation unit which words are appended to the next translation unit by the overlap processing, as the translation result of the next translation unit.

The control section 1 determines whether an instruction to end the translation processing is provided through the operation section 4 or not (S8). When determining that no instruction to end the processing is provided (S8: NO), the control section 1 returns the procedure to step S1, and repeats the processings of steps S1 to S7. When determining that an instruction to end the processing is provided (S8: YES), the control section 1 ends the above-described translation processing.

As described above, the translation apparatus 10 of the present embodiment displays the inputted pre-translation English character-string on the display section 5, translates it into Japanese as needed, and displays the translation result in a state of being associated with the English words being displayed. Consequently, since the inputted English words and the Japanese equivalents which are the translation result are displayed in a state of being associated with each other, the viewer/listener can readily grasp not only the inputted English words but also the translation result. Moreover, the translation apparatus 10 of the present embodiment extracts as needed the English words included in a predetermined translation unit, from English words inputted as needed, and translates them for each extracted unit. Consequently, translation processing can be progressively performed without a wait for the interruption or end of character-string input, which enables highly real-time processing in the processing from the character-string input to the translation result display. The translation apparatus 10 is not limited to the structure that translates English into Japanese as long as a dictionary for translation into a target language is prepared.

In the translation apparatus 10 of the present embodiment, since the overlap processing is performed when the English words of each translation unit are extracted from the inputted English words, highly accurate translation processing can be executed even when the translation units into which the control section 1 performs division are not always units appropriate for translation like when a collocation is divided between translation units lined one behind another. Moreover, since the translation result of the words of the current translation unit which words are appended to the next translation unit by the overlap processing is displayed as the translation result of the next translation unit, the translation result can be displayed more accurately.

In the present embodiment, the translation section 12 successively stores, into the buffer, the character-strings included in the translation units extracted by the translation unit extraction section 11, and the display control section 13 successively stores the result of translation by the translation section 12 into the buffer. In addition thereto, for example, the character-strings successively inputted through the operation section 4, or the voice input section 6 and the voice recognition processing section 3 may be stored into the buffer in units of words. In this case, in performing the overlap processing, the translation unit extraction section 11 can efficiently extract the words duplicately extracted from translation units lined one behind another.

In the present embodiment, the number of words included in one translation unit and the number of overlapping words are a preset number or a number arbitrarily changed by the user. In addition thereto, for example, when a collocation is included at the end of the current translation unit, all the words constituting this collocation may be included in the next translation unit. Specifically, when a first translation unit includes a first word, a second word, a third word, a fourth word and a fifth word and the second and third words constitute a collocation, the second to fifth words may be allocated to the next translation unit. In this case, for example, the translation unit extraction section 11 determines whether the words in the inputted character-string constitute a collocation or not based on the collocations registered in the translation dictionary 2b. When determining that the words constitute a collocation, the translation unit extraction section 11 determines whether or not the words constituting the collocation are divided at the border of whether the words are allocated to the next translation unit by the overlap processing or not. Then, when determining that the collocation is divided at the border, the translation unit extraction section 11 allocates all the words constituting the collocation to the next translation unit.

In the present embodiment, a structure has been described in which the character information inputted through the operation section 4 provided in the translation apparatus 10 and the character information obtained by converting the voice information inputted through the voice input section 6 by voice reorganization processing are translated. However, a structure may be adopted in which the translation apparatus 10 is provided with only one of the operation section 4 and the voice recognition processing section 3 as the means for obtaining the character-strings of the object to be translated.

Moreover, for example, a structure may be adopted in which the translation apparatus 10 is connected to an external apparatus through the network I/F section 7 and the external apparatus translates the character information or the voice information obtained through its own operation section or voice input section. With this structure, in a video conference system including a plurality of terminal apparatuses connected through a network, by providing one terminal apparatus with the function of the translation apparatus of the present application, the users of the other terminal apparatuses can be notified of the character information or the voice written or uttered by the users of the terminal apparatuses and the translation result thereof through the network.

While a preferred embodiment of the present invention has been concretely described, the structures, operations and the like may be changed as appropriate and are not limited to the above-described embodiment.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A translation apparatus that translates a character-string written in a first language into a second language, comprising:
an obtaining section that obtains, as needed, a character-string written in the first language;
a display section that displays, as needed, the character-string obtained by the obtaining section;
an extraction section that divides, as needed, a character-string into predetermined units to be translated and extracts character-strings from the character-string obtained by the obtaining section in such a manner that a predetermined number of words from an end of a character-string in a current predetermined unit are appended to a head of a character-string in the next predetermined unit, a translation section that performs translation into the second language for each character-string extracted by the extraction section; and a display control section that displays, on the display section, a result of translation by the translation section in a state of being associated with the character-string displayed on the display section, wherein the extraction section determines whether words in the character-string obtained by the obtaining section constitute a collocation or not, wherein when the extraction section determines that the words in the character-string obtained by the obtaining section constitute the collocation, the extraction section determines whether or not part of the words constituting the collocation are words appended to a head of a character-string in the next predetermined unit, and wherein when the extraction section determines that the part of the words constituting the collocation are words appended to a head of a character-string in the next predetermined unit, the extraction section extracts character-strings in such a manner that all of the words constituting the collocation are appended to a head of a character-string in the next predetermined unit.

2. The translation apparatus according to claim 1, wherein the translation section assigns an equivalent in the second language to a word included in the character-string extracted by the extraction section.

3. The translation apparatus according to claim 1, wherein the display control section displays, on the display section, a translation result of words appended to a head of a character-string in the next predeteremined unit from an end of a character-string in a current predetermined unit, the as a translation result of the character-string in the next predetermined unit.

4. The translation apparatus according to claim 1, further comprising:

a word number acceptance section that accepts the number of words of the character-string in the current predetermined unit which words are appended to the character-string in the next predetermined unit.

wherein the extraction section appends words of the number accepted by the word number acceptance section, from the end of the character-string in the current predetermined unit, to the head of the character-string in the next predetermined unit.

5. The translation apparatus according to claim 1, further comprising:

wherein the obtaining section includes at least one of an input acceptance section that accepts, as needed, input of a character-string written in the first language or a character-string conversion section that accepts, as needed, input of a voice uttered in the first language and converts the accepted voice in to a character-string as needed.

6. The translation apparatus according to claim 5, wherein the extraction section designates, as the predetermined unit, a character-string accepted by the input acceptance section before the input of the character-string is interrupted for not less than a predetermined period of time from start of the input, a character-string accepted by the input acceptance section within a preset period of time, a character-string of a preset number of words, or a character-string of a preset text length.

7. The translation apparatus according to claim 5, wherein the extraction section designates, as the predetermined unit, a character-string obtained by converting a voice accepted by the character-string conversion section before silence continues for not less than a predetermined period of time from start of the input of the voice, a character-string in a processing unit when the character-string conversion section converts the voice into a character-string, a character-string obtained by converting a voice accepted by the character-string conversion section within a preset period of time, a character-string of a preset number of words, or a character-string of a preset text length.

8. A system for translating a character-string written in a first language into a second language by a translation apparatus, comprising:

one or more processing devices and one or more storage devices storing instructions that, when executed by the one or more processing devices, cause the one or more processing devices to:

obtain, as needed, a character-string written in the first language and displaying the obtained character-string on a display section;

divide, as needed, a character-string into predetermined units to be translated and extract character-strings from the obtained character-string in such a manner that a predetermined number of words from an end of a character-string in a current predetermined unit are appended to a head of a character-string in the next predetermined unit;

perform translation into the second language for each extracted character-string; and display a translation result on the display section in a state of being associated with the character-string displayed on the display section, wherein when it is determined by the extraction process that the words from an end of a character-string in the current predetermined unit constitute the collocation, it is determined by the extraction process whether or not part of the words constituting the collocation are words appended to a head of a character-string in the next predetermined unit, and wherein when it is determined by the extraction process that the part of the words constitute the collocation are words appended to a head of a character-string in the next predetermined unit, character-strings are extracted by the extraction process in such a manner that all of the words constituting the collocation are appended to a head of a character-string in the next predetermined unit.

9. A non-transitory recording medium recording a computer program for causing a computer to translate a character-string written in a first language into a second language, said computer program comprising steps of:

causing the computer to obtain, as needed, a character-string written in the first language and display the obtained character-string on a display section;

causing the computer to divide, as needed, a character-string into predetermined units to be translated, and extract character-strings from the obtained character-string in such a manner that a predetermined number of words from an end of a character-string in a current predetermined unit are appended to a head of a character-string in the next predetermined unit;

causing the computer to perform translation into the second language for each extracted character-string; and causing the computer to display a translation result on the display section in a state of being associated with the character-string displayed on the display section, wherein it is determined by the extraction step whether words in the obtained character-string constitute a collocation or not, wherein when it is determined by the extraction step that the words in the obtained character string constitute the collocation, it is determined by the extraction step whether or not part of the words constituting the collocation are words appended to a head of a character-string in the next predetermined unit, and wherein when it is determined by the extraction step that the part of the words constituting the collocation are words appended to a head of a character-string in the next predetermined unit, character-strings are extracted by the extraction step in such a manner that all of the words constituting the collocation are appended to a head of a character-string in the next predetermined unit.

\* \* \* \* \*